United States Patent [19]

McGrey et al.

[11] Patent Number: 5,774,990
[45] Date of Patent: Jul. 7, 1998

[54] APPARATUS FOR CUTTING AND SERVING BAKED GOODS

[76] Inventors: Fabiola B. McGrey; Steven J. McGrey, both of 11624 Jollyville Rd. #1227, Austin, Tex. 78759

[21] Appl. No.: 780,363

[22] Filed: Jan. 9, 1997

[51] Int. Cl.[6] ............................................. A21C 5/00
[52] U.S. Cl. ..................................... 30/114; 30/303
[58] Field of Search ......................... 30/114, 124, 314, 30/315, 317, 302, 303, 142; D7/649, 650

[56] References Cited

U.S. PATENT DOCUMENTS

| D. 248,271 | 6/1978 | McGee, III | D7/142 |
|---|---|---|---|
| 1,931,388 | 10/1933 | Ling | 30/114 |
| 2,424,015 | 7/1947 | Booker | 30/302 |
| 2,598,789 | 6/1952 | Harrell | 30/114 |
| 2,770,035 | 11/1956 | O'Brien | 30/114 |
| 2,841,868 | 7/1958 | O'Brien | 30/114 |
| 3,711,945 | 1/1973 | Cronheim | 30/142 |
| 3,877,143 | 4/1975 | Montesi | 30/114 |
| 4,310,971 | 1/1982 | Rowell | 30/114 |
| 4,637,138 | 1/1987 | Piche | 30/114 |
| 4,847,998 | 7/1989 | Colozzi et al. | 30/114 |
| 5,165,171 | 11/1992 | MacLean | 30/114 |
| 5,403,534 | 4/1995 | Kim | 30/526 |

*Primary Examiner*—Hwei-Siu Payer

[57] ABSTRACT

A cutting and serving apparatus for cutting and serving baked goods comprising a front isosceles triangular hollow section; an angled back segment coupled to the front isosceles triangular hollow section wherein the angled back segment cuts a back portion and crust of a pie; and a handle member coupled to the angled back segment. The front isosceles triangular hollow section comprises two leg members wherein left and right sides thereof have a plurality of equally spaced serrations formed therein for cutting a pie, cake or other pastries into wedged segments. The angled back segment comprises parallel angulated blades for cutting a back portion and crust of a pie.

14 Claims, 2 Drawing Sheets 5,774,990

1

APPARATUS FOR CUTTING AND SERVING BAKED GOODS

TECHNICAL FIELD

The present invention relates to a cutting apparatus and, more particularly, to an apparatus for cutting and serving baked goods such as cakes, pastries, pies or the like. The apparatus of the present invention is simple to use and evenly cuts baked goods into wedged segments.

BACKGROUND OF THE INVENTION

Typically baked goods, such as cakes, pastries, pies or the like, are cut and removed using separate utensils. Using separate utensils requires additional cleaning by the baker or user. Additionally, if only a knife is used to cut the baked goods and the cut wedged segment is removed without a serving utensil, the baked good crumbles and is often cumbersome to handle when placing on a serving dish.

SUMMARY OF THE INVENTION

The preferred embodiment of the apparatus for cutting and serving of the present invention solves the aforementioned problems in a straight forward and simple manner. What is provided is an apparatus for cutting and serving baked goods such as cakes, pastries, pies or the like. The apparatus of the present invention is simple to use and evenly cuts baked goods into wedged segments.

In particular, a cutting and serving apparatus comprising a front isosceles triangular hollow section, angled back segment coupled to said front isosceles triangular hollow section, and a handle member coupled to the angled back segment.

In view of the above, it is an object of the invention to provide a front isosceles triangular hollow section comprising two equal length leg members and an apex wherein the left and right surfaces of the leg members, each has formed therein substantially equally spaced serrations for evenly cutting baked goods such as cakes, pies and other pastries into wedged segments.

Another object of the invention is to provide an apex wherein the top surface thereof is sloping downward for providing a spatula effect when removing a cut wedged segment and serving.

A further object of the invention is to provide a handle member which is cylindrically shaped for ease of gripping and applying a force of pressure when cutting.

It is still a further object of the invention is to provide an angled back segment having first and second parallel angulated blades for cutting the back portion and crust of a pie.

It is still a further object of the invention to provide a unitary cutting and serving utensil which cuts baked goods evenly into wedged segments and serves the baked goods without the baked goods crumbling.

In view of the above objects of the invention, a feature of the invention is that the cutting and serving apparatus of the present invention is inexpensive and easily manufactured.

Another feature of the present invention is that the cutting and serving apparatus is easily cleaned after use.

A further feature of the present invention is that the cutting and serving apparatus is useable to cut pies in baking dishes having varied side wall heights.

The above objects and other features will become apparent from the drawings, the detail description given herein and the appended claims.

2

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF THE EXEMPLARY EMBODIMENT

Figure 1:
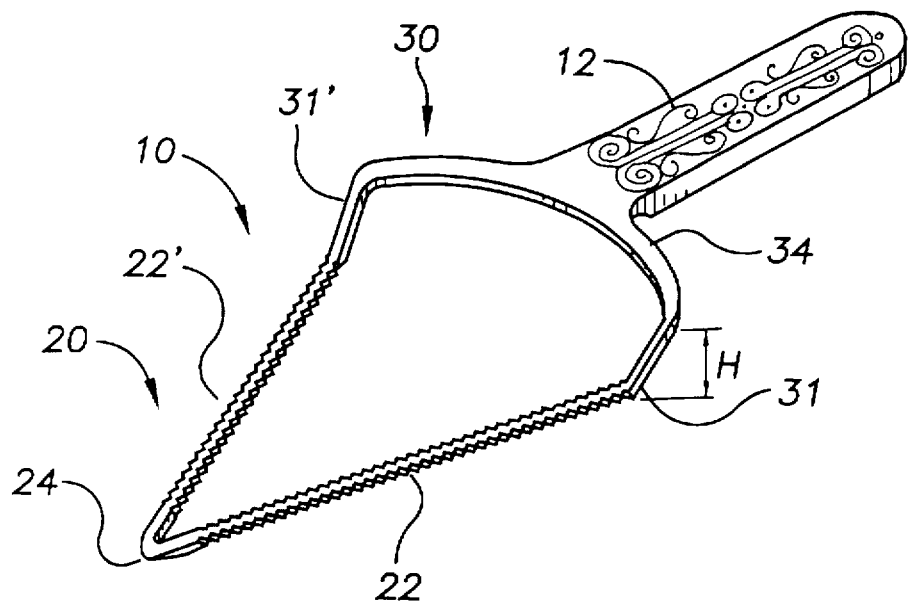
FIG. 1 illustrates a preferred embodiment of the cutting and serving apparatus of the present invention.

Referring now to the drawings, and in particular FIG. 1, the cutting and serving apparatus of the present invention is designated generally by the numeral 10. Cutting and serving apparatus 10 of FIG. 1 comprises handle member 12, front isosceles triangular hollow section 20 and angled back segment 30.

Front isosceles triangular hollow section 20 comprises two equal length leg members 22 and 22' and apex 24. Legs 22 and 22' have a height of approximately ⅛" but not limited thereto. The left and right surfaces of leg members 22 and 22', each have formed therein substantially equally spaced serrations. One distal end of each of the leg members 22 and 22' are unitarily joined together via apex 24. The top surface of apex 24 is sloping downward whereby, when removing the baked goods, the sloped top surface of apex 24 provides a spatula effect for lifting the wedged segment of the cut baked goods.

Angled back segment 30 comprises first and second parallel angulated surfaces 31 and 31', first and second angulated parallel blades (only 32 shown in FIG. 2) and curved back member 34. The top surface of first and second parallel angulated surfaces 31 and 31', respectively, are flat. The bottom surface of first and second parallel angulated surfaces 31 and 31', respectively, unitarily couple to first and second parallel angulated blades (only 32 shown in FIG. 2), respectively. One distal end of the first and second parallel angulated surfaces 31 and 31', respectively, are unitarily joined with the other distal end of leg members 22 and 22', respectively. The other distal end of each of first and second parallel angulated surfaces 31 and 31', respectively, couple to a respective distal end of curved back member 34. In the exemplary embodiment, the curvature of curved back member 34 is substantially equal to a ⅛ wedged segment of a cake, pie or other pastry having a diameter of substantially 12" and leg members 22 and 22' are proportioned appropriately. However, the apparatus of the present invention may be dimensioned for use with a 7, 8 or 9 inch pie, cake or other pastries. Moreover, the curvature of curved back member 34 may be dimensioned to cut the pie, cake or other pastries into wedged segments of ⅟16, ¼, etc. of a cake, pie or other pastry.

Curved back member 34 has unitarily coupled in the center thereof handle member 12, along the back surface of curved back member 34. In the exemplary embodiment, handle member 12 is a flat handle member having a top surface area. The top surface area, for decorative purposes, comprises decorative engraving. The apparatus of the embodiment of FIG. 1 is preferably silver plated or the like for fine dining.

First and second parallel angulated surfaces 31 and 31' are angled in accordance with a conventional aluminum pie pan side wall in which pies are baked. Additionally, the length of the slope of first and second angulated surfaces 31 and 31' positions curved back member 34 at a height H so that cutting and serving apparatus 10 can be used to cut pies, into wedged segments, baked in baking pans or dishes having varied side wall heights.

Figure 2:
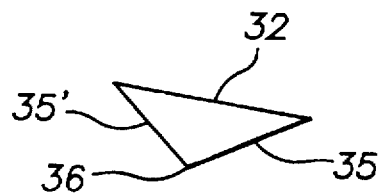
FIG. 2 illustrates an end view of the angulated blade of the embodiment of the present invention of FIG. 1.

Referring to FIG. 2, an end view of the angulated blade of the present invention is shown. Each of the first and second parallel angulated blades (only 32 shown) comprises first and second beveled surfaces 35 and 35' unitarily joined together via apex 36 wherein apex 36 provides a pointed edge for cutting the back portion and crust of a pie or other pastry. First and second parallel angulated blades (only 32 shown) extend the length of first and second parallel angulated surfaces 31 and 31'. In the preferred embodiment first and second parallel angulated blades (only 32 shown) are not razor sharp.

Figure 3:
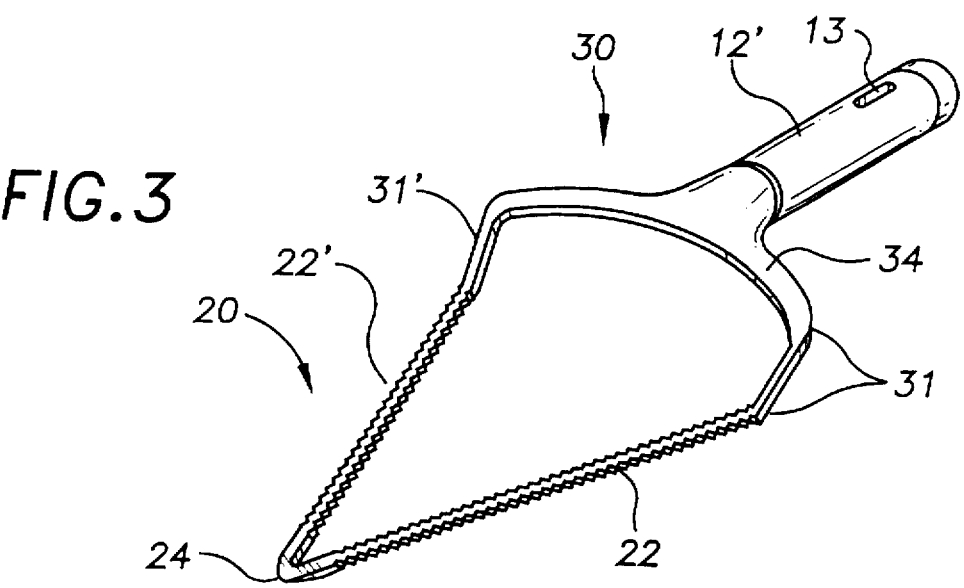
FIG. 3 illustrates an alternative embodiment of the cutting and serving apparatus of the present invention.

Referring to FIG. 3, an alternative embodiment of the present invention is illustrated. The embodiment of FIG. 3 differs from FIG. 1 only in that the apparatus of the embodiment of FIG. 3 is made of plastic or the like for everyday use. Furthermore, handle member 12' is cylindrically shaped having aperture 13 formed therein for storing the apparatus of the present invention on a rack, if desired.

Figure 4:
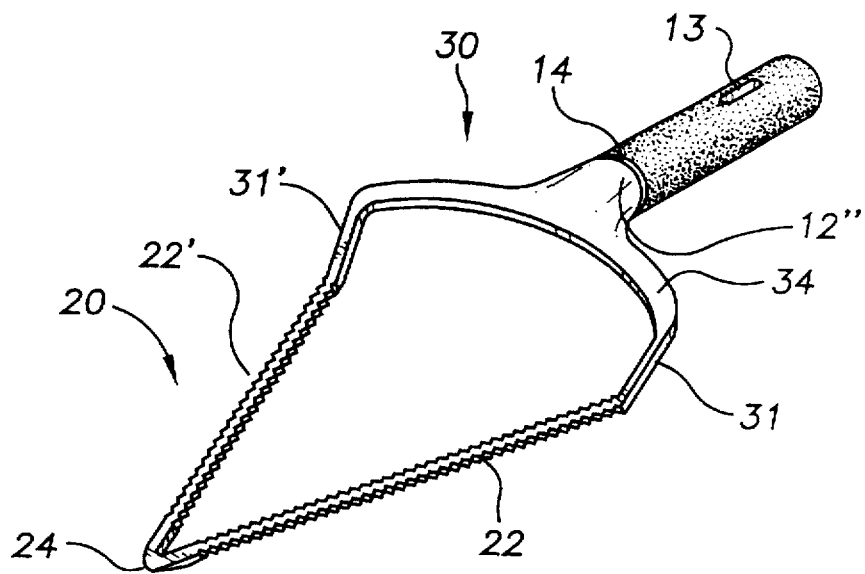
FIG. 4 illustrates another alternative embodiment of the apparatus of the present invention.

Referring to FIG. 4, another alternative embodiment of the present invention is shown. The embodiment of FIG. 4 differs from FIG. 3 only in that handle member 12" comprises rubber-like jacket 14 which is tightly coupled to the cylindrically shaped handle member.

The following description will be referring the operation of the apparatus of the present invention. A user or baker will place cutting and serving apparatus 10 above the area of the baked item to be cut. The user or baker will apply a force of pressure in the downward direction to cutting and serving apparatus 10 via handle member 12. The serration of leg members 22 and 22' and first and second angulated blades (only 32 shown) will cut the baked goods.

When cutting a pie, a force is applied to cutting and serving apparatus 10 via handle member 12 in a backward direction for cutting the back portion of the pie and crust thereof. The angle of first and second angulated blades (only 32 shown) will cut the back portion of a pie and crust thereof in the pie pan or other baking dishes.

When cutting a cake, the force in the backward direction is not necessary since cakes are typically very soft in texture throughout and does not have a crust formed on a back surface of a pie pan or other baking dish.

To serve the baked goods such as cakes, pies or other pastries, the user or baker carefully lifts cutting and serving apparatus 10 by applying an upward force of pressure to handle member 12. Apex 24 should be carefully slid under the cut wedged segment. A forward force of pressure is applied then to handle member 12 for further sliding cutting and serving apparatus 10 under the cut wedged segment wherein apex 24 provides a spatula effect. Additionally, when sliding cutting and serving apparatus 10 under the cut wedged segment, apex 24 and front isosceles triangular hollow section 20 should be offset such that the cut wedged segment does not fall through front isosceles triangular hollow section 20. The user or baker then lifts the cut wedged segment and places the cut wedged segment of baked goods onto a serving dish.

It is noted that the embodiment of the cutting and serving apparatus described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A cutting and serving apparatus for cutting baked goods into wedged segments and serving the baked goods comprising:

a front isosceles triangular hollow section;

an angled back segment coupled to said front isosceles triangular hollow section wherein said angled back segment cuts a back portion and crust of a pie; and a handle member coupled to said angled back segment;

said front isosceles triangular hollow section comprising:

two equal length leg members; and an apex;

wherein the left and right surfaces of said leg members, each have formed therein substantially equally spaced serrations and one distal end of each of said leg members are unitarily joined together via said apex.

2. The apparatus of claim 1, wherein a top surface of said apex is sloping downward for providing a spatula effect.

3. A cutting and serving apparatus for cutting baked goods into wedged segments and serving the baked goods comprising:

a front isosceles triangular hollow section;

an angled back segment coupled to said front isosceles triangular hollow section wherein said angled back segment cuts a back portion and crust of a pie; and a handle member coupled to said angled back segment;

said angled back segment comprising:

first and second parallel angulated surfaces;

first and second parallel angulated blades unitarily coupled to a bottom surface of said first and second parallel angulated surfaces, respectively; and a curved back member wherein distal ends thereof each couple to one distal end of each of the first and second parallel angulated surfaces.

4. A cutting and serving apparatus for cutting baked goods into wedged segments and serving the baked goods comprising:

a front isosceles triangular hollow section;

an angled back segment coupled to said front isosceles triangular hollow section, said angled back segment comprises:

first and second parallel angulated surfaces, first and second parallel angulated blades coupled to a bottom surface of said first and second parallel angulated surfaces, and a curved back member wherein distal ends thereof each couple to one distal end of each of the first and second parallel angulated surfaces; and a handle member coupled in the center of said curved back member.

5. The apparatus of claim 4, wherein said front isosceles triangular hollow section comprises:

two equal length leg members; and an apex;

wherein the left and right surfaces of said leg members, each have formed therein substantially equally spaced serrations and one distal end of each of said leg members are unitarily joined together via said apex.

6. The apparatus of claim 5, wherein a top surface of said apex is sloping downward for providing a spatula effect.

7. The apparatus of claim 4, wherein said handle member is cylindrically shaped having an aperture formed therein.

8. The apparatus of claim 7, wherein said handle member comprises a rubber-like jacket which is tightly coupled to the cylindrically shaped handle member.

9. A cutting and serving apparatus for cutting baked goods into wedged segments and serving the baked goods comprising:

a front isosceles triangular hollow section, said front isosceles triangular hollow section comprises:
two equal length leg members, and
an apex,
wherein the left and right surfaces of said leg members, each have formed therein substantially equally spaced serrations and one distal end of each of said leg members are unitarily joined together via said apex;

an angled back segment coupled to said front isosceles triangular hollow section; and a handle member coupled to said angled back segment.

10. The apparatus of claim 9, wherein a top surface of said apex is sloping downward for providing a spatula effect.

11. The apparatus of claim 9, wherein said handle member is cylindrically shaped having an aperture formed therein.

12. The apparatus of claim 11, wherein said handle member comprises a rubber-like jacket which is tightly coupled to the cylindrically shaped handle member.

13. The apparatus of claim 9, wherein said angled back segment comprises:

first and second parallel angulated surfaces;

first and second parallel angulated blades unitarily coupled to a bottom surface of said first and second parallel angulated surfaces, respectively; and a curved back member wherein distal ends thereof each couple to one distal end of each of the first and second parallel angulated surfaces.

14. The apparatus of claim 9, wherein said angled back segment cuts a back portion and crust of a pie.

* * * * *